J. E. FREYMAN.
COUNTERSINK.
APPLICATION FILED MAY 14, 1910.
975,944.
Patented Nov. 15, 1910.
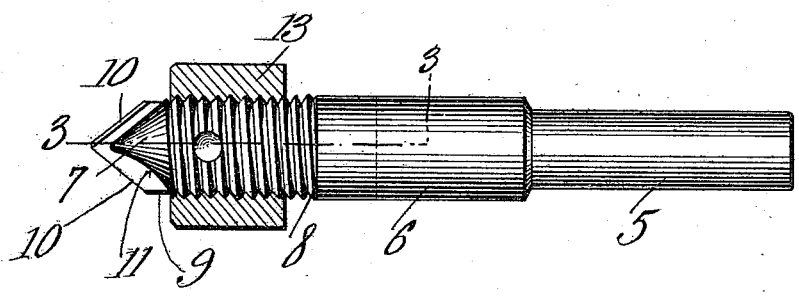
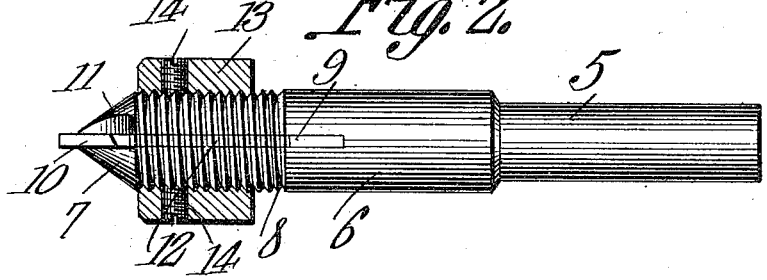
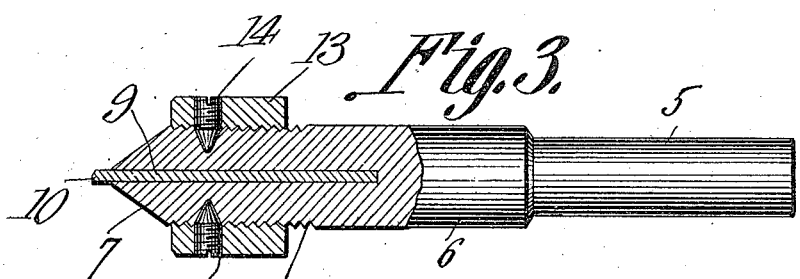
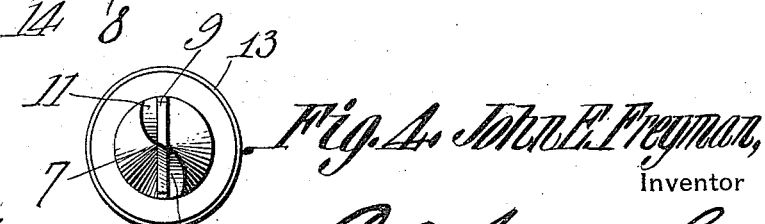
Witnesses
Inventor John E. Freyman,
by C. A. Snow & Co.
Attorneys

UNITED STATES PATENT OFFICE.

JOHN ERNST FREYMAN, OF SCHENECTADY, NEW YORK.

COUNTERSINK.

975,944.  Specification of Letters Patent.  Patented Nov. 15, 1910.

Application filed May 14, 1910. Serial No. 561,462.

*To all whom it may concern:*

Be it known that I, JOHN E. FREYMAN, a citizen of the United States, residing at Schenectady, in the county of Schenectady and State of New York, have invented a new and useful Countersink, of which the following is a specification.

This invention relates to tools for countersinking holes, and also for reaming centers, and performing similar work.

It is the object of the invention to provide the tool with interchangeable cutters, and also to provide novel holding means therefor, so that the cutters can be readily removed for sharpening when worn.

With these objects in view, the invention consists in a novel construction and arrangement of parts to be hereinafter described and claimed, reference being had to the accompanying drawing, in which, Figures 1 and 2 are elevations of the tool in two different positions with parts in section. Fig. 3 is a longitudinal section of the tool cut on the line 3—3 of Fig. 1. Fig. 4 is an end view of the tool.

Referring to the drawing, 5 denotes the stock, the same being cylindrical, and enlarged at its forward end as indicated at 6, said enlarged portion terminating in a conical point 7. The enlargement is exteriorly screw threaded for a short distance back of the cone as indicated at 8, and it is also split centrally and longitudinally from a point a short distance to the rear of the threaded portion, and through the apex of the cone, to form a slot in which the cutter 9 is held. The cutter is a flat blade having its forward end ground to the proper taper and angle, to form two opposite cutting edges 10 which come to a point. This point extends a short distance beyond the apex of the cone, and the cutting edges extend slightly beyond the surface of the cone. Recesses 11 are made in the surface of the cone at diametrically opposite points, adjacent to the slot, to allow the chips to settle. The opposite edges of the cutter, to the rear of its cutting edges, are screw threaded as indicated at 12 to match the threads 8. A nut 13 is screwed on the threads 8 and the matching threads of the cutter, which nut securely holds the latter in place on the stock. The nut is locked by set screws 14 threaded therethrough, and engaging depressions in the stock.

By the herein described structure, the cutter can be readily removed when dull, and then sharpened. Several cutters of different angles will be provided, these cutters being interchangeable, and their threads matching the threads of the stock. The cutters can be repeatedly sharpened before they become too short for use, and they can then be replaced at a very small cost.

What is claimed is:

A countersink comprising a stock pointed at one end, and slotted at said end, and said slotted portion being exteriorly screw threaded behind the pointed end, a cutting blade mounted in the slot, and having its cutting edges extending beyond the point of the stock, the opposite edges of the cutter being screw threaded, said threads matching the threads of the stock, and a nut screwed on the threaded portions of the cutter and the stock.

In testimony that I claim the foregoing as my own, I have hereto affixed my signature in the presence of two witnesses.

JOHN ERNST FREYMAN.

Witnesses:
 GEORGE LANGENACKER,
 BENJAMIN T. WEBER.